(12) United States Patent
Tettay Villegas

(10) Patent No.: US 12,213,611 B2
(45) Date of Patent: Feb. 4, 2025

(54) UNITARY FRUIT SLICER AND JUICER

(71) Applicant: Juan Felipe Tettay Villegas, Medellin (CO)

(72) Inventor: Juan Felipe Tettay Villegas, Medellin (CO)

(*) Notice: Subject to any disclaimer, the term of this patent is extended or adjusted under 35 U.S.C. 154(b) by 632 days.

(21) Appl. No.: 17/645,079

(22) Filed: Dec. 20, 2021

(65) Prior Publication Data

US 2023/0190028 A1 Jun. 22, 2023

(51) Int. Cl.
*A47J 19/02* (2006.01)
*A23N 1/00* (2006.01)
*A23N 1/02* (2006.01)

(52) U.S. Cl.
CPC ............ *A47J 19/023* (2018.08); *A23N 1/00* (2013.01); *A23N 1/02* (2013.01)

(58) Field of Classification Search
CPC .............. A23N 1/02; A23N 1/00; A47J 19/02
See application file for complete search history.

(56) References Cited

U.S. PATENT DOCUMENTS

| | | | |
|---|---|---|---|
| 3,714,887 A * | 2/1973 | Johnson | A23N 1/02 99/485 |
| 5,170,699 A * | 12/1992 | Senalada | A23N 1/003 99/507 |
| 5,445,067 A * | 8/1995 | Font | A23N 1/003 99/507 |
| 6,655,615 B1 * | 12/2003 | Hartmann | A23N 1/02 241/86.1 |
| 7,493,851 B2 * | 2/2009 | Mengual | A23N 1/003 99/504 |
| 8,607,698 B2 | 12/2013 | Pichler | |
| 8,783,171 B2 * | 7/2014 | Lin | A47J 19/02 99/506 |
| 9,445,626 B2 | 9/2016 | Contell Albert et al. | |
| 9,918,578 B2 | 3/2018 | Stolk et al. | |
| 10,098,492 B2 | 10/2018 | Catalano et al. | |
| 10,130,118 B2 * | 11/2018 | Contell Albert | A47J 19/023 |
| 10,231,564 B2 | 3/2019 | Wang et al. | |
| 10,881,128 B2 | 1/2021 | Flotats Molinas | |
| 2017/0224002 A1 * | 8/2017 | Flotats Molinas | A23N 1/02 |
| 2020/0093169 A1 | 3/2020 | Edtmayr et al. | |
| 2020/0260898 A1 | 8/2020 | Kim | |
| 2020/0288763 A1 | 9/2020 | Medel Cabello | |
| 2020/0323252 A1 * | 10/2020 | Asensio Camacho | E03D 11/14 |

* cited by examiner

*Primary Examiner* — Sean M Michalski
(74) *Attorney, Agent, or Firm* — Dunlap Bennett & Ludwig, PLLC; Anna L. Kinney

(57) ABSTRACT

A fruit slicing and juicing machine includes a first roller mounted next to a second roller within a housing as well as a power train. The first roller has a curved blade and a pair of domes with a channel in between opposite the curved blade. The second roller has a pair of basins with a control ridge in between and a pair of curved control wedges opposite the basins. The rollers have parallel longitudinal axes. The power train is attached to the rollers and rotates them simultaneously in opposite directions. The domes fit into the basins when the rollers rotate. The machine slices fruit inserted over the rollers. Each half slides into a basin in the second roller. The domes of the first roller press juice out of the fruit halves as they rotate into the basins of the second roller.

10 Claims, 5 Drawing Sheets

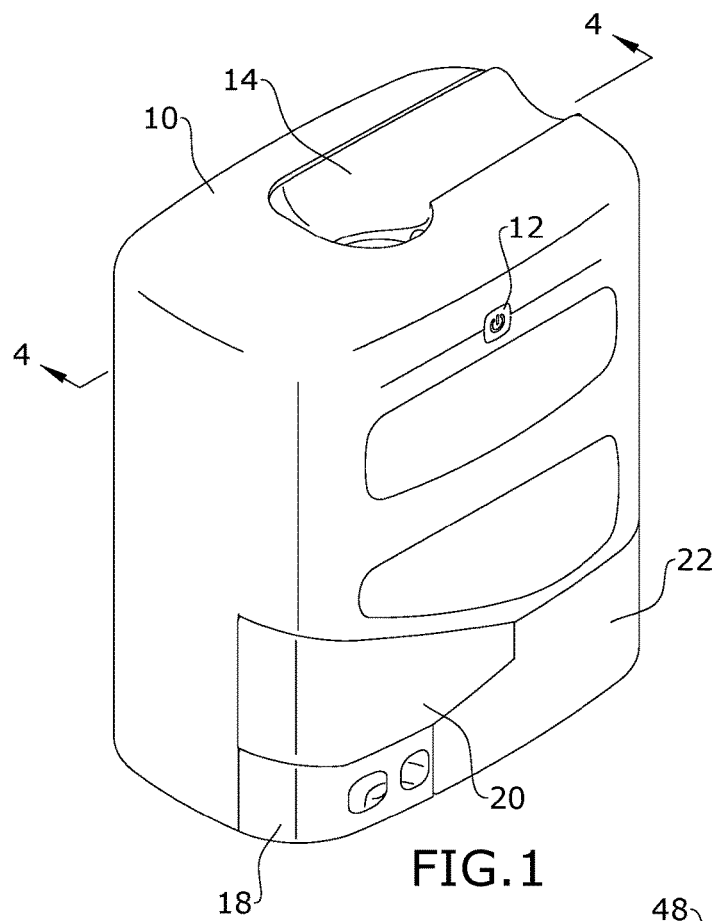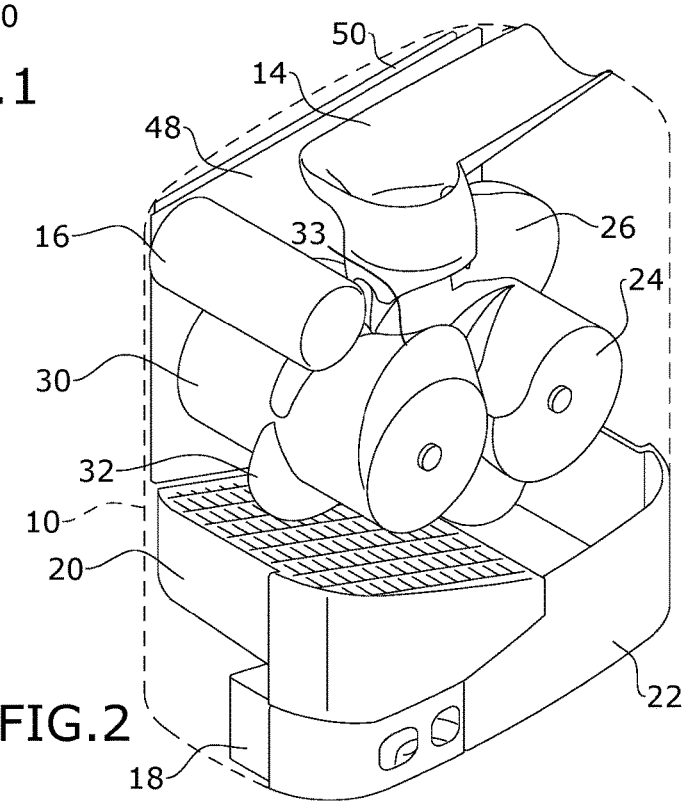

UNITARY FRUIT SLICER AND JUICER

BACKGROUND OF THE INVENTION

The present invention relates to fruit juicers and, more particularly, to a unitary fruit slicer and juicer.

Fruit juice is one of the most widely consumed beverages in the world. It is sold in almost every grocery store. It has tremendous health benefits and is enjoyed by a wide demographic of consumers across the globe.

Freshly squeezed fruit is widely regarded to not just have a better taste, but to be healthier as it lacks any preservatives or additives as compared to juice sold in a container. However, squeezing or pressing fresh fruit requires a lot of time and effort. On top of simply squeezing or pressing a fruit for juice, fruits with a tough peel must have their peel separated from the rest of the fruit. These fruits must often be sliced as well. Slicing and removing peels requires even more effort.

There are some automatic, electric juicers currently on the market. However, these juicers still require the user to manually peel the fruit. If the fruit is not peeled, the currently available machines blend or mix the peel in with the juice, ruining the taste. These automatic machines are bulky and take up a lot of counterspace. In addition, they require a user to be present when the machine is operating to put the fruit into the machine.

As can be seen, there is a need for a compact fruit slicer and juicer that does not require the user to peel the fruit and that may be operated without a user present.

SUMMARY OF THE INVENTION

In one aspect of the present invention, a fruit slicing and juicing machine is provided, comprising a housing; a first roller mounted within the housing; said first roller having a first longitudinal axis, a curved blade, and a pair of domes with a channel formed therebetween substantially antipodal to the curved blade; a second roller mounted juxtaposed with the first roller within the housing; said second roller having a second longitudinal axis parallel to the first longitudinal axis, a pair of basins configured to accommodate the pair of domes, a control ridge projecting midway between the pair of basins, and a pair of curved control wedges substantially antipodal to the pair of basins; and a power train mounted within the housing and coupled to the first roller and the second roller, said power train being operative to rotate said first roller and said second roller simultaneously in opposite directions.

These and other features, aspects and advantages of the present invention will become better understood with reference to the following drawings, description, and claims.

BRIEF DESCRIPTION OF THE DRAWINGS

FIG. 1 is a perspective view of a juicer apparatus according to an embodiment of the present invention;

FIG. 2 is a perspective view thereof, shown with a cover removed;

DETAILED DESCRIPTION OF THE INVENTION

Figure 3:
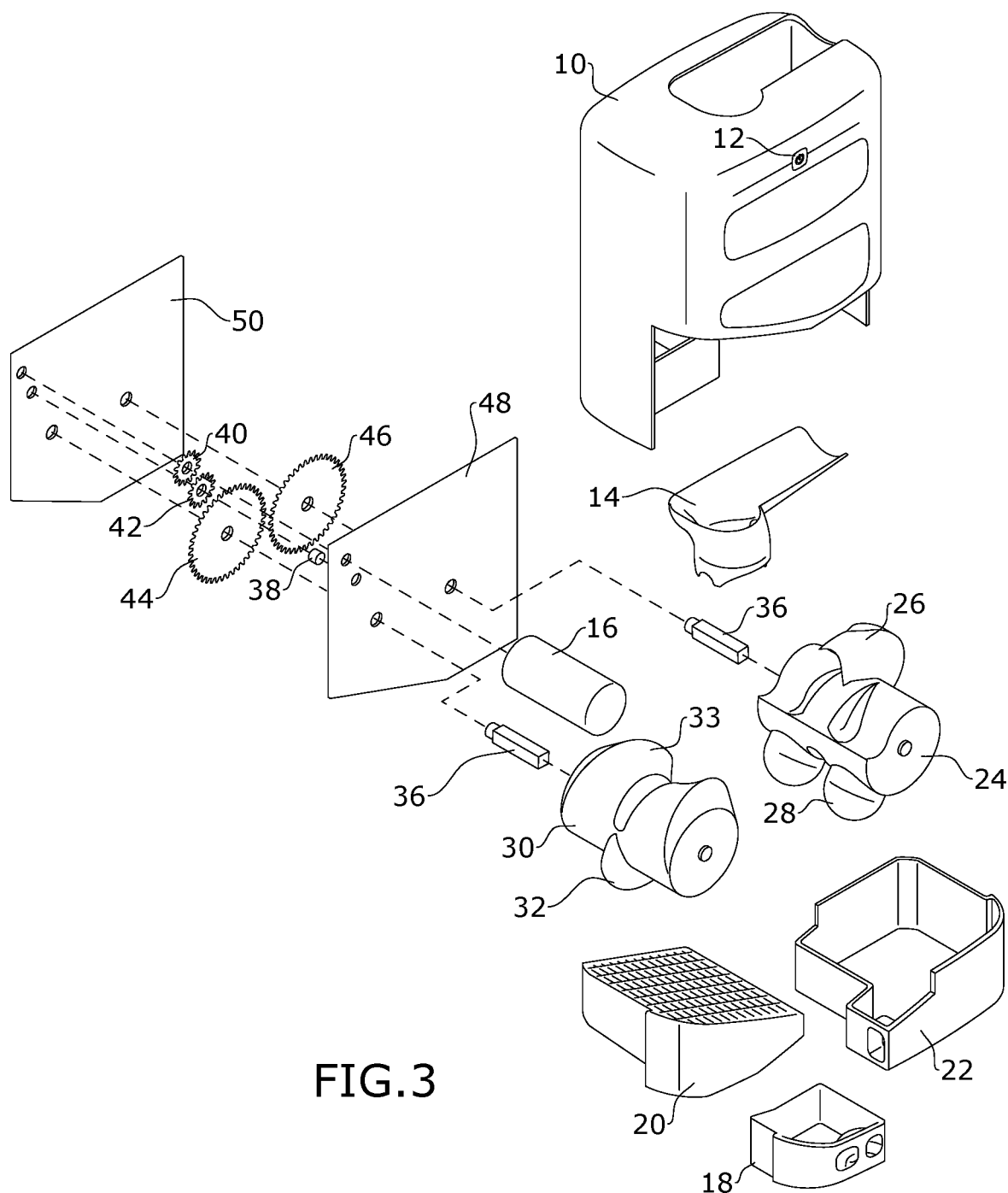
FIG. 3 is an exploded view thereof.

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims with reference to the drawings.

Broadly, an embodiment of the present invention provides a unitary machine for automatically slicing and juicing fruits. Whole fruits may be placed on a hopper or a guide. The fruits may roll down the hopper into the machine and onto a paired set of two uniquely shaped rollers. As the rollers rotate by one angle, they slice, and by another angle, they press or squeeze, the fruit. Juice from the fruit is collected in a juice container. The invention is particularly suited for, but is not limited to, round fruits with a peel such as citrus fruits.

The inventive device may be compact and may be placed on a kitchen countertop, with a capacity to store several fruits. Alternatively, the device may be configured for industrial use.

The present invention may be automatically operated. A method of using the inventive juicer includes the following. A user may place fruit into the hopper and may press a "start" button. The hopper may store up to about four fruits, depending in part upon the size of the fruit. As each fruit drops onto an intersection of the two rollers, the juicer sequentially cuts and presses the fruit in a manner that does not damage the peel. The juicer may continue to extract the juice from subsequent fruit until there are no more fruits in the hopper. When the user returns, the machine may have a glass of freshly squeezed juice waiting.

A warning signal may alert a user that the machine is over torqued.

The power train is not particularly limited. In some embodiments, the number and/or size of the gears may be optimized. Alternatively, a different power transmission mechanism may be used, such as a belt. The motor may have cables and may be an electric motor operated with a printed circuit board (PCB) which may be affixed to the chassis or the back plate. When the start button is activated, the PCB sends a signal to the electric motor. The PCB may determine juice extraction variables and when the machine may stop operating.

In some embodiments, the geometry and/or texture of the rollers may be modified to alter an operating speed and/or position of fruit in the machine. In some cases, the rollers may be described as a "positive" roller and a "negative" roller.

The materials and methods of manufacture are not particularly limited. For example, each component may be manufactured by plastic injection, metal and plastic computer numerical control (CNC), and machining according to known procedures in the art. The individual components may be assembled according to known procedures in the art.

Referring now to FIGS. 1 through 9, FIG. 1 shows a unitary fruit slicer and juicer according to an embodiment of the present invention. The apparatus comprises an outer shell 10 and/or chassis, a portion of which is preferably removable for cleaning and/or maintenance, as shown in FIG. 2. The outer shell 10 supports a hopper 14 configured as a trough descending to form a funnel. A power button 12 shown on an exterior vertical surface of the outer shell enables a user to power the apparatus on or off. A juice receptacle 18, a wedge-shaped screen 20, and a waste basket or scrap container 22 are slidably removable through the outer shell 10. The juice receptacle 18 is positioned horizontally adjacent to the waste basket 22 with the screen 20 covering an open region of the juice receptacle 18 and extending into an upper region or portion of the waste basket 22, with an upper surface of the screen 20 inclining from the waste basket 22 to a distal edge of the juice receptacle 18 such that fruit skins fall into the waste basket 22 while juice passes through the screen 20. In other words, the screen 20 slopes downward to the waste basket 22.

Figure 9:
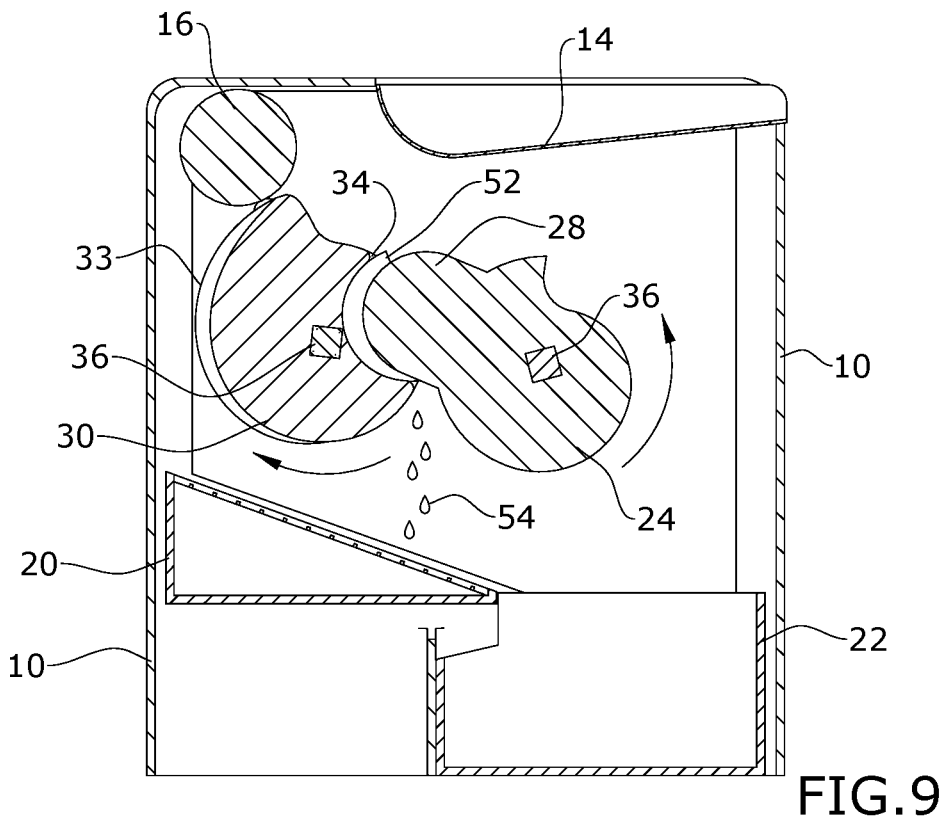
FIG. 9 is another front sectional view, taken along line 7-7 of FIG. 6, shown in use.

The interior components of the apparatus are shown in FIGS. 2 and 3. A drive train comprising a transmission 38 and rotatably linked gears 40, 42, 44, 46 is mounted between and concealed by a front plate 48 and a back plate 50. A bushing 38 is also provided. A first roller 24 has a pair of adjacent domes 28 mated to a pair of adjacent basins 34 in a second roller 30. A curved blade 26 on the first roller 24 substantially antipodal to the pair of domes 28 and midway along a longitudinal axis of the roller 24 is configured to pass through a channel in the second roller 30 without touching. The placement of the domes 28 and channel therebetween may range from about 150° or less to about 210° or more with respect to the blade. The second roller 30 has a control ridge 32 midway along a longitudinal axis of the roller 30 and a pair of control wedges 33 substantially antipodal to the control ridge 32 adjacent to the channel, each having a curved surface facing the channel. The first roller 24 has corresponding receding or indented surfaces. The rollers 24, 30 are mounted above the juice receptacle 18, the screen 20, and the waste basket or scrap container 22, utilizing gravity to guide squeezed juice 54 (as shown in FIG. 9) and any fruit scrap material. The first roller 24 is mounted on a shaft 36 which extends through the front plate 48 and rotatably couples with a first gear 46. The second roller 30 is independently mounted on a shaft 36 which extends through the front plate 48 and rotatably couples with a second gear 44. A motor 16 is mounted to the front plate 48 and the back plate 50 and couples with a third gear 40. In operation, the motor 16 rotates the gears 40, 42, 44, 46, which in turn rotate the shafts 36, thereby transmitting power from the motor 16 to the rollers 24, 30.

Figure 4:
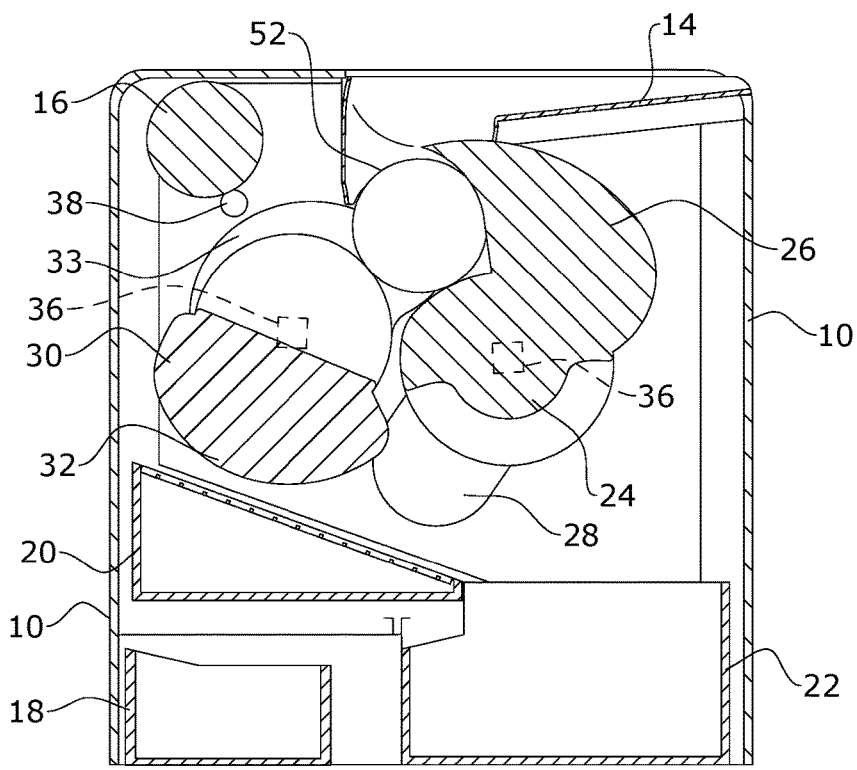
FIG. 4 is a front sectional view thereof, taken along line 4-4 in FIG. 1, shown in use.
Figure 5:
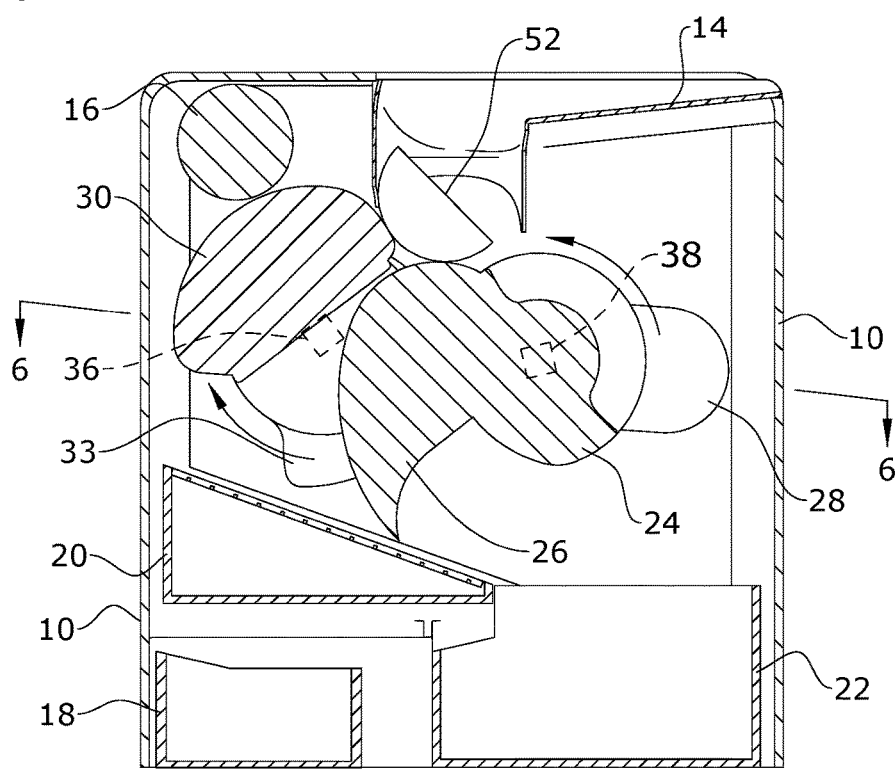
FIG. 5 is a front sectional view thereof, taken along line 4-4 in FIG. 1, shown in use.
Figure 6:
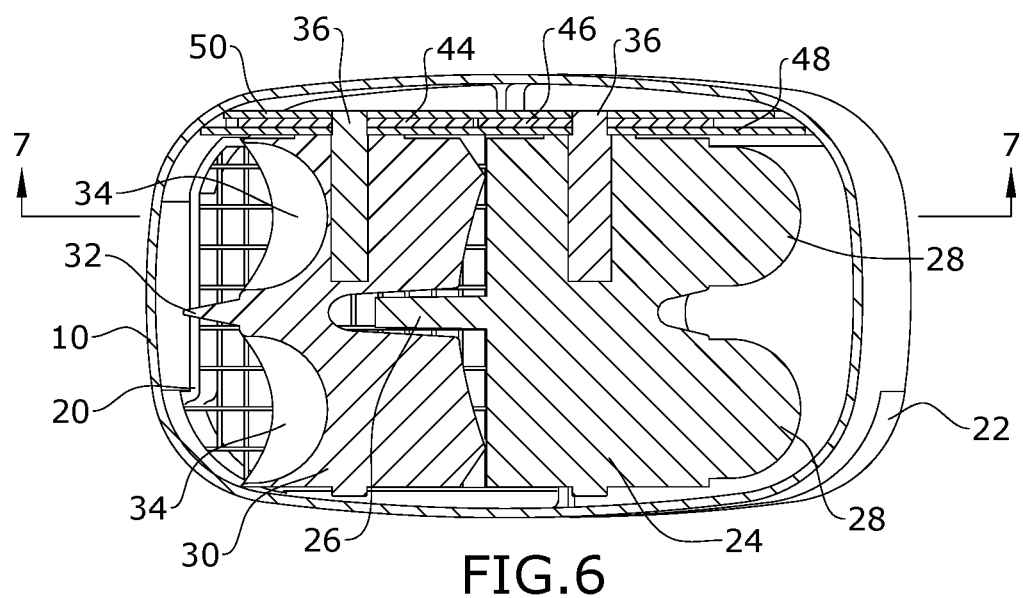
FIG. 6 is a top sectional view thereof, taken along line 6-6 in FIG. 5.
Figure 7:
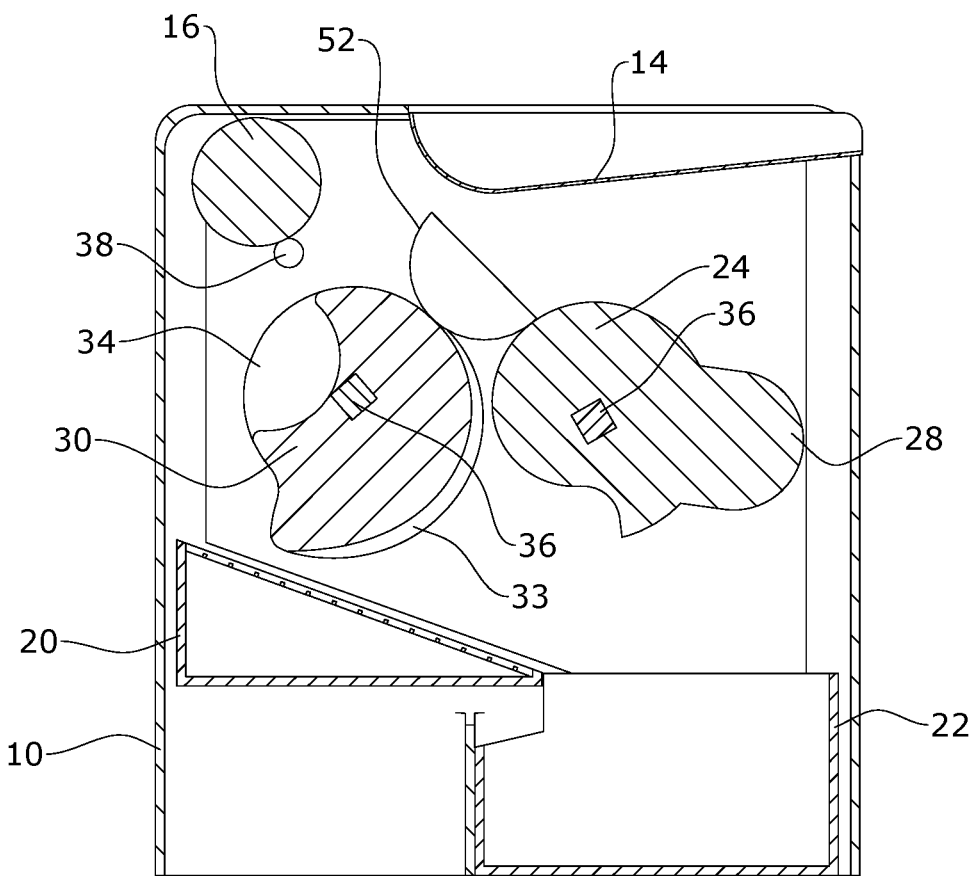
FIG. 7 is a front sectional view thereof, taken along line 7-7 of FIG. 6, shown in use.
Figure 8:
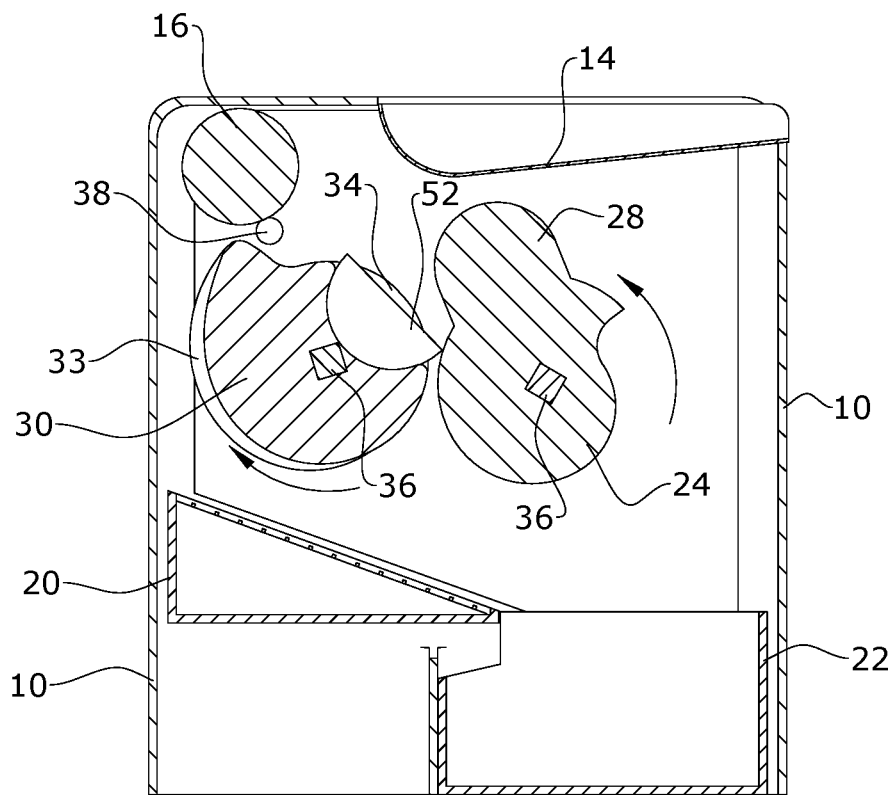
FIG. 8 is another front sectional view, taken along line 7-7 of FIG. 6, shown in use.

FIGS. 4-9 depict various stages of operation of the machine according to an embodiment of the present invention. In FIG. 4, a fruit 52 moves from the hopper 14 to a region between the control wedges 33 of the second roller 30 and the first roller 24. As shown in FIG. 5, the rollers 24, 30 rotate simultaneously in opposite directions (in this case, roller 30 is shown rotating clockwise and roller 24 is shown rotating counterclockwise), and the fruit 52 is sliced in half by the curved blade 26 extending from the first roller 24. As the rollers 24, 30 continue to rotate, the curved blade 26 passes through the channel or gap in the second roller 30, as most clearly shown in FIG. 6, and each half of the fruit 52 slides into one of two basins 34 in the second roller 30, as seen in FIGS. 7 and 8. A control ridge 32 extending from the second roller 30 guides the fruit 52 halves into the basins 34. A rotation of the rollers 24, 30 shifts the domes 28 into the basins 34, thereby pressing the fruit 52 positioned in the two basins 34 and squeezing juice out of the fruit 52, as best seen in FIG. 9.

As the fruit 52 is pressed, juice 54 falls from the fruit 52 through a screen 20 and collects in a juice receptacle 18. The screen 20 covers the juice receptacle 18, screening the juice entering the juice receptacle 18, and prevents a peel or a skin of the fruit 52 from falling into the juice receptacle 18, diverting the peel or skin into a waste basket or scrap container 22. The waste basket or scrap container 22 may be emptied by a user after the skins have been collected therein. The juice receptacle 18 may be withdrawn from the juicer and the user may transfer the juice 54 into a glass (not pictured).

It should be understood, of course, that the foregoing relates to exemplary embodiments of the invention and that modifications may be made without departing from the spirit and scope of the invention as set forth in the following claims.

What is claimed is:

1. A fruit slicing and juicing machine, comprising:
   a housing;
   a first roller mounted within the housing; said first roller having a first longitudinal axis, a curved blade, and a pair of domes with a channel formed therebetween substantially antipodal to the curved blade;
   a second roller mounted juxtaposed with the first roller within the housing; said second roller having a second longitudinal axis parallel to the first longitudinal axis, a pair of basins operative to accommodate the pair of domes, a control ridge projecting midway between the pair of basins, and a pair of curved control wedges substantially antipodal to the pair of basins; and
   a power train mounted within the housing and coupled to the first roller and the second roller, said power train being operative to rotate said first roller and said second roller simultaneously in opposite directions.

2. The fruit slicing and juicing machine of claim 1, further comprising a slidably removable juice receptacle mounted within the housing beneath the second roller; a slidably removable scrap container mounted within the housing beneath the first roller and adjacent to the slidably removable juice receptacle; and a slidably removable wedge-shaped screen mounted within the housing above the slidably removable juice receptacle, wherein an upper surface of the slidably removable wedge-shaped screen slopes downward to an upper region of the slidably removable scrap container.

3. The fruit slicing and juicing machine of claim 1, further comprising a removable outer shell.

4. The fruit slicing and juicing machine of claim 1, further comprising a hopper formed in an upper surface of the housing having a trough descending to form a funnel midway across the upper surface.

5. The fruit slicing and juicing machine of claim 1, wherein the second roller further comprises a channel between the pair of curved control wedges operative to accommodate the curved blade.

6. The fruit slicing and juicing machine of claim 1, wherein the channel of the first roller is operative to accommodate the control ridge of the second roller.

7. The fruit slicing and juicing machine of claim 1, further comprising a button mounted on an exterior of the housing, said button being operative to activate the power train.

8. The fruit slicing and juicing machine of claim 1, wherein the power train comprises a motor, a plurality of rotatably linked gears, and a transmission operative to transmit kinetic energy from the motor to the plurality of rotatably linked gears.

9. A method for slicing and juicing a fruit, comprising:
providing the fruit slicing and juicing machine of claim 1;
inserting a fruit over an intersection between the first roller and the second roller;
rotating the first roller in a first direction and simultaneously rotating the second roller a second direction opposite the first direction by a first angle such that the curved blade slices the fruit into fruit halves;
rotating the first roller and the second roller further by a second angle such that the fruit halves are positioned in the pair of basins in the second roller;
rotating the first roller and the second roller further by a third angle, thereby pressing said fruit halves between the pair of domes and the pair of basins to extract juice from a peel without damaging the peel; and
collecting the juice in a juice receptacle.

10. The method of claim 9, further comprising screening the juice entering the juice receptacle and diverting the peel into a scrap container.

\* \* \* \* \*